(12) United States Patent
Takahashi

(10) Patent No.: US 6,615,900 B2
(45) Date of Patent: Sep. 9, 2003

(54) CONNECTING ROD WITH BALL JOINT AND MANUFACTURING METHOD THEREOF

(75) Inventor: Kunihisa Takahashi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/051,155

(22) Filed: Jan. 22, 2002

(65) Prior Publication Data

US 2002/0056339 A1 May 16, 2002

Related U.S. Application Data

(62) Division of application No. 09/430,249, filed on Oct. 29, 1999, now abandoned.

(30) Foreign Application Priority Data

Oct. 30, 1998 (JP) ............................................. 10-311112

(51) Int. Cl.⁷ ........................ B22D 19/12; B21D 53/10
(52) U.S. Cl. ........................ 164/108; 164/111; 164/112; 164/137; 29/898.049; 29/898.043; 29/898.12
(58) Field of Search ............................ 164/91, 98, 108, 164/112, 111, 137, 333; 29/898.049, 898.054, 898.043, 898.048, 898.12, 527.5

(56) References Cited

U.S. PATENT DOCUMENTS

| | | | | |
|---|---|---|---|---|
| 3,570,090 A | * | 3/1971 | Teramachi | 29/898.049 |
| 4,320,983 A | | 3/1982 | Urasaki | 403/139 |
| 4,979,844 A | * | 12/1990 | Teramachi | 403/134 |
| 5,070,609 A | | 12/1991 | Teramachi | 29/898.049 |
| 5,092,703 A | * | 3/1992 | Kobayashi | 403/122 |
| 5,419,522 A | | 5/1995 | Luecke et al. | 403/56 X |
| 5,609,433 A | | 3/1997 | Pazdirek et al. | 403/140 |
| 5,758,986 A | | 6/1998 | Kraps | 403/135 |
| 6,098,287 A | * | 8/2000 | Takahashi et al. | 29/898.043 |
| 6,109,816 A | * | 8/2000 | Iwasaki | 403/135 |
| 6,164,860 A | | 12/2000 | Kondo | 403/56 X |

FOREIGN PATENT DOCUMENTS

| | | |
|---|---|---|
| EP | 0725153 A1 | 8/1996 |
| EP | 0832769 A2 | 4/1998 |
| FR | 2.012.564 | 3/1970 |
| JP | 63-006211 A * | 1/1988 |
| JP | 63028710 | 2/1988 |
| JP | 62288716 | 12/1988 |
| JP | 10059206 | 3/1998 |
| WO | WO 97/05398 | 2/1997 |

* cited by examiner

Primary Examiner—Tom Dunn
Assistant Examiner—Kevin McHenry

(57) ABSTRACT

An object of this invention is to provide a connecting rod in which a pair of ball-shanks are connected to a rod main body such that they are axially perpendicular to each other, having a sufficient strength and which can be produced easily and at low cost, and a manufacturing method thereof. The connecting rod of this invention to achieve such an object comprises first and second ball-shanks and a rod main body to which the first and second ball-shanks are connected freely swingably and rotatably. The first ball-shank is connected to the rod main body such that the shank portion is perpendicular thereto, while the second ball-shank is connected to the rod main body such that the shank is in parallel thereto. Further, the rod main body is die cast with a ball portion of each ball-shank inserted as a core.

2 Claims, 4 Drawing Sheets

1. rod main body
2. joint portion
3a. first ball receiving portion
3b. second ball receiving portion
4. first ball-shank
5. second ball-shank (a)

(b)

(c)

(d)

CONNECTING ROD WITH BALL JOINT AND MANUFACTURING METHOD THEREOF

This is a Division application Ser. No. 09/430,249 filed Oct. 29. 1999, and now abandoned. The disclosure of the prior application(s) is hereby incorporated by reference herein in its entirety.

FIELD OF THE INVENTION AND RELATED ART STATEMENT

The present invention relates to a connecting rod for use in a steering portion, stabilizer portion and the like of a vehicle, and more particularly to a connecting rod having a pair of ball joints on both ends of a rod main body and in which shanks swingably provided on the ball joints are disposed such that axes thereof intersect each other at 90°.

Conventionally, this kind of the connecting rod has been disclosed in Japanese Patent Application Laid-Open No. 10-59206. This connecting rod is so constructed by connecting two ball joints 110, 111 in which a holder is connected to a shank in a different way as shown in FIG. 5. That is, in the ball joint 110, the holder 112 is connected to the ball-shank 113 in a substantially L-shape and in the other ball joint 111, the holder 114 is connected to the ball-shank 115 in a substantially I-shape. By connecting the holder 112 of the ball joint 110 to the ball-shank 115 of the ball joint 111, a substantially L-shaped connecting rod in which a pair of the ball-shanks are disposed such that their axes intersect each other at 90° is formed.

However, upon manufacturing the substantially L-shaped connecting rod by connecting the two ball joints, a distance between the center of swings of the ball joints or a distance between the centers has to be adjusted at the time of connecting the ball joints, so that the connecting work becomes complicated. Further, two kinds of the ball joints have to be manufactured because the connecting styles of the holder and ball-shank are different. As a result, numbers of necessary parts and manufacturing steps increase thereby leading to an increase of production cost.

On the other hand, Japanese Patent Application Laid-Open No. 63-28710 has disclosed a connecting rod in which a pair of ball joints are formed integrally by aluminum die casting. This connecting rod, as shown in FIG. 6, comprises a rod main body 105 having a pair of ball-shanks 102 in which a ball portion 101 is formed at a front end of a shank portion 100 and a pair of socket portion 104, 104 provided at both ends of a shaft portion 103 for accommodating a ball portion 101 of each of the ball-shank 102. Socket portions 104 of the rod main body and shaft portion 103 are formed integrally by aluminum die casting. The ball portion 101 of each ball-shank 104 is accommodated in the socket portion 104 of the rod main body 105 together with bearing 106 made of synthetic resin. As a result, the shank portions 102 of the ball-shank 102 are swingable with respect to each of the aforementioned socket portions 104, 104, so that the ball joints are formed on both ends of the rod main body 105.

However, if it is intended to produce a connecting rod in which a rod main body thereof is made of aluminum diecast and a pair of ball joints are connected in a substantially L shape, of a pair of the socket portions 104, 104 provided on the rod main body 105, one socket portion 104 has to be open in an axial direction of the rod main body 105, so that strength of the ball joint to be assembled by the socket portion 104 is short. That is, in a ball joint which is connected to the rod main body 105 in line, the ball portion 101 has to be encased in the socket portion 104 against an axial force applied to the ball-shank 102 and an axial force applied to the rod main body 105. However, because the socket portion 104 is open in the axial direction of the rod main body 105, if an excessive force is applied thereto, the ball portion 101 may escape from the socket portion 104 together with the bearing 106. Therefore, upon manufacturing a connecting rod in which a pair of the ball joints are connected in a substantially L shape, it is difficult to construct the ball joint by forming a pair of the socket portions in the rod main body as disclosed in Japanese Patent Application Laid-Open No. 63-28710.

OBJECT AND SUMMARY OF THE INVENTION

Accordingly, the present invention has been accomplished in views of these problems and therefore, it is an object of the invention to provide a connecting rod in which a pair of ball-shanks are connected to a rod main body such that they are axially perpendicular to each other, having a sufficient strength and which can be manufactured easily and at a low cost, and a manufacturing method of the same.

To achieve the above object, the present invention provides a connecting rod comprising first and second ball-shanks in which a ball portion is formed at a shank portion each of thereof; a rod main body having first and second ball receiving portions for holding the ball portions of the first and second ball-shanks, having a joint portion which has the ball receiving portions at both ends thereof, and connected the first or second ball-shanks freely swingably and rotatably; and wherein said first ball-shank is connected to said rod main body such that the shank portion thereof is perpendicular to the joint portion, while said second ball-shank is connected to said rod main body such that the shank portion thereof is parallel to the joint portion, and said rod main body is die-cast with the ball portion of the ball-shank being inserted as core, so that said first ball receiving portion, second ball receiving portion and joint portion are integral.

In the connecting rod of the present invention having such a structure, a rod main body for connecting a pair of the ball-shank is formed by die-casting with the ball portion of each ball-shank being inserted as a core. Thus, the ball portion is encased by the ball receiving portion of the rod main body, so that the ball-shank is firmly connected to the rod main body. Because the rod main body is cast such that the ball portion of the ball-shank is encased therein, a procedure for connecting the ball portion of the ball-shank to the rod main body such that they are freely swingable is eliminated, thereby making it possible to manufacture the connecting rod easily at low cost.

On the other hand, as for a manufacturing method of the connecting rod of the present invention having such a structure, if the aforementioned first and second ball-shanks are connected to the rod main body such that they intersect the joint portion of the rod main body, the rod main body in which the ball is encased by the ball receiving portion can be produced using the manufacturing method described in Japanese Patent Application Publication No. 5-7786. That is, according to this disclosed manufacturing method, upon casting a holder with a ball inserted into a cast die as a core, the ball is sandwiched by a pair of the supporting portions projecting from the die so that it is not moved in the die. When the ball joint is completed, the shank portion of the ball-shank projects from the opening portion formed in the holder by this supporting portion. Therefore, if a pair of the ball-shanks are parallel to each other in a connecting rod of the present invention, the opening portions of the pair of the opening portions formed in the rod main body have only to be open in the same direction, so that upon casting of the rod main body, the ball can be fixed in the die easily.

However, in a connecting rod of the present invention, as described above, the first ball-shank intersects the joint portion of the rod main body and the second ball-shank is parallel to the joint portion of the rod main body. That is, the first ball-shank and second ball-shank are axially perpendicular to each other. Therefore, the opening portions to be provided in the rod main body for the ball-shanks need to be open in directions perpendicular to each other and a pair of the balls inserted into the casting die must be sandwiched from opposite directions. Thus, upon manufacturing of the connecting rod of the present invention, the manufacturing method described in Japanese Patent Application Publication No. HEI5-7786 cannot be just applied and a new manufacturing method needs to be invented by improving the aforementioned manufacturing method in order to diecast the rod main body with a pair of the balls fixed securely in the casting die.

That is, the present invention provides a manufacturing method of a connecting rod for connecting first and second ball-shanks swingably and rotatably on both ends of a rod main body such that shanks thereof are perpendicular to each other, the manufacturing method comprising: first step for closing first and second die half bodies, inserting a first ball into a cavity formed in the die half bodies and fixing a first ball in the cavity with a first supporting portion projecting from the die half bodies; second step for closing a third die half body with respect to the closed first and second die half bodies in a direction perpendicular to the closing direction of the first and second die half bodies, inserting a second ball into a cavity formed by the three die half bodies, and fixing the second ball in the cavity with the second supporting portion projecting from the first and second die half bodies and third supporting portion projecting from the third die half body; third step for casting the rod main body holding the first and second balls and in which opening portions communicating with each of the balls are formed corresponding to the first-third supporting portions by pouring molten metal into cavities in casting dies formed by closing the respective die half bodies; fourth step for forming the first and second ball-shanks by joining the shank to each of the balls in the rod main body via an opening portion formed in the rod main body by the first-third supporting portions; and fifth step for forming a gap between each ball and rod main body by providing the rod main body and each ball-shank with an external force.

According to this manufacturing method, the die for casting the rod main body is divided to the first-third die half bodies and, of a pair of the balls to be inserted into cavities of the die half bodies, the first ball is sandwiched by the first supporting portion projecting from the first and second die half bodies, and the second ball is sandwiched by the second supporting portion projecting from the first and second die half bodie and the third supporting portion projecting from the third die half body. Therefore, the ball never shakes when molten metal is poured into the cavity and the rod main body can be cast in such a condition that these balls are held securely at each predetermined position in the cavity. As a result, a gap between the ball and ball receiving portion formed in the rod main body is eliminated, so that smooth rotation and swing of the ball-shank with respect to the rod main body are ensured.

DETAILED DESCRIPTION OF THE PREFERRED EMBODIMENTS

Hereinafter, the connecting rod with ball joints and manufacturing method of the present invention will be described with reference to the accompanying drawings.

Figure 1:
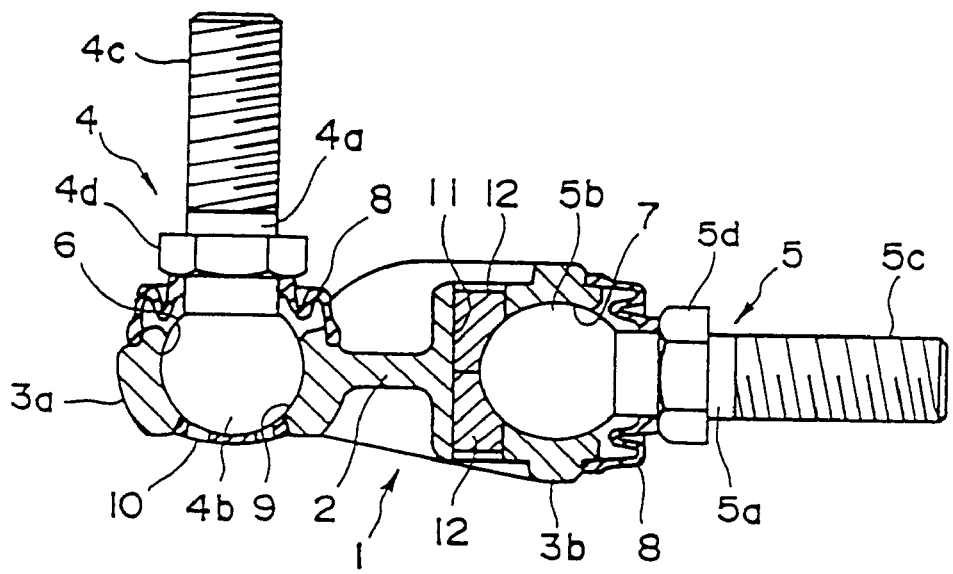
FIG. 1 is a sectional view showing an embodiment of a connecting rod of the present invention.
Figure 2:
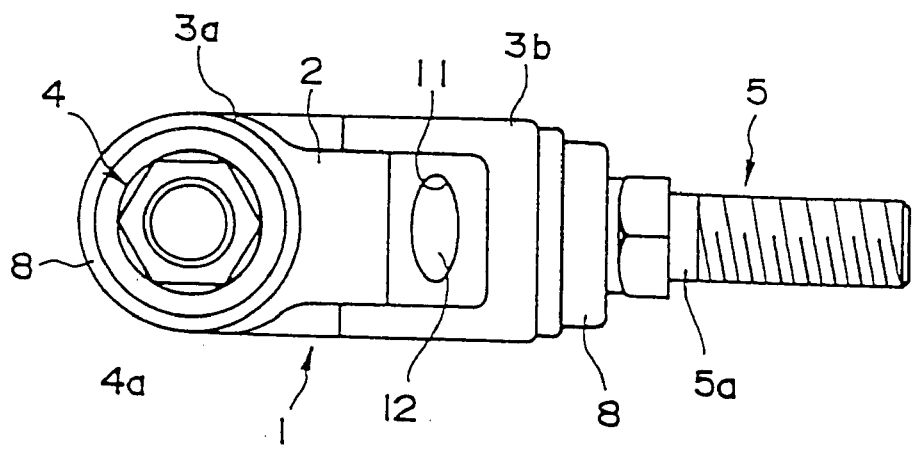
FIG. 2 is a plan view showing a connecting rod of the embodiment.

FIGS. 1, 2 show an embodiment of the connecting rod of the present invention. Reference numeral 1 denotes a rod main body having first ball receiving portion 3a and second ball receiving portion 3b on both ends of a joint portion 2. Reference numeral 4 denotes a first ball-shank which engages the first ball receiving portion 3a of the rod main body 1. Reference numeral 5 denotes a second ball-shank which engages the second ball receiving portion 3b of the rod main body 1.

Each ball-shank 4 (or 5) is provided with a ball portion 4b (or 5b) having a high sphericalness at an end of a shank portion 4a (or 5a) and the aforementioned shank portion 4a (or 5a) has a connecting male screw 4c (5c). The ball portion 4b (or 5b) is held rotatably and swingably in each ball receiving portion 3a, 3b of the rod main body 1 with a minimum gap. Hexagonal tool engaging portions 4d, 5d are formed at proximal ends of the respective ball-shanks 4, 5 for a wrench to be capable of engaging to rotate the ball-shanks 4, 5 when the connecting male screws 4c, 5c formed on the shank portions 4a, 5a are joined with other movable portion (not shown).

Further, connecting opening portions 6, 7 are provided in the respective ball receiving portions 3a, 3b of the rod main body 1 and the shank portion of each of the ball-shanks 4, 5 is projected from each of the connecting opening portions 6, 7. The connecting opening portion 6 formed in the first ball receiving portion 3a is open in a direction perpendicular to the length direction of the rod main body 1 or a direction of arrangement of the ball receiving portions 3a, 3b and on the other hand, the connecting opening portion 7 formed in the second ball receiving portion 3b is open in the same direction as the length direction of the rod main body 1. Thus, the shank portions 4a, 5a of the ball-shanks 4, 5 projected from the connecting opening portions 6, 7 engage the rod main body 1 such that they are substantially perpendicular to each other, thereby the entire connecting rod being formed in a substantially L shape.

A sealing member 8 is attached between an outer edge of each of the ball receiving portions 3a, 3b and the proximal portion of each of the tool engaging portions 4d, 5d of the respective ball-shanks 4, 5, so that lubricant pockets for accommodating lubricant such as grease supplied to a gap between the ball portions 4b, 5b and ball receiving portions 3a, 3b are formed and further an invasion of dust, dirt and the like into the gap from the connecting opening portions 6, 7 is prevented.

Further, a lubrication opening portion 9 in which the ball portion 4b of the first ball-shank 4 is exposed is provided on an opposite side of the first ball receiving portion 3a to the connecting opening portion 6 and a cap member 10 made of synthetic resin is attached over this lubrication opening portion 9 and the lubricant pocket for accommodating lubricant such like grease is also formed therearound. This cap member 10 is mounted to the ball receiving portion 3a such that it slightly presses the ball portion 4b of the first ball-shank 4, thereby preventing an occurrence of metallic sound which is caused by a collision between the ball portion 4b and ball receiving portion 3a if an external force in the axial direction is suddenly applied to the first ball-shank 4.

On the other hand, a through hole 11 is made in the second ball receiving portion 3b in parallel to the axial direction of the first ball-shank 4 such that a top portion of the ball portion 5b of the second ball-shank 5 is exposed in such a through hole 11. This through hole is filled with sliding member 12 made of synthetic resin containing lubricant so that lubricant is supplied to a gap between the ball portion 5b and ball receiving portion 3b by a sliding contact between the sliding member 12 and ball portion 5b. This sliding member 12 is mounted in the through hole 11 so as to slightly press the ball portion 5b of the second ball-shank 5 so as to prevent an occurrence of metallic sound which is caused by a collision between the ball portion 5b and ball receiving portion 3b if an external force is suddenly applied to the second ball-shank 5 in the axial direction.

Next, a manufacturing method of the connecting rod of this embodiment will be described.

According to this manufacturing method, first, the rod main body is die-cast with zinc or aluminum base alloy (for example, JIS zinc alloy diecast class 1 or 2, aluminum alloy diecast class 3, class 10 or class 12). For such a casting, first as shown in FIG. 3(a), first die half body 20 and second die half body 21 are closed and a steel ball 30 having a high sphericalness is inserted into a first cavity 22 formed by that closing as a core (first step). At this time, the inserted steel ball 30 is sandwiched by first supporting portions 20a, 21a projected from an inner surface of the first and second die half bodies 20, 21 so that it is fixed at a predetermined position in the first cavity 22.

Figure 3:
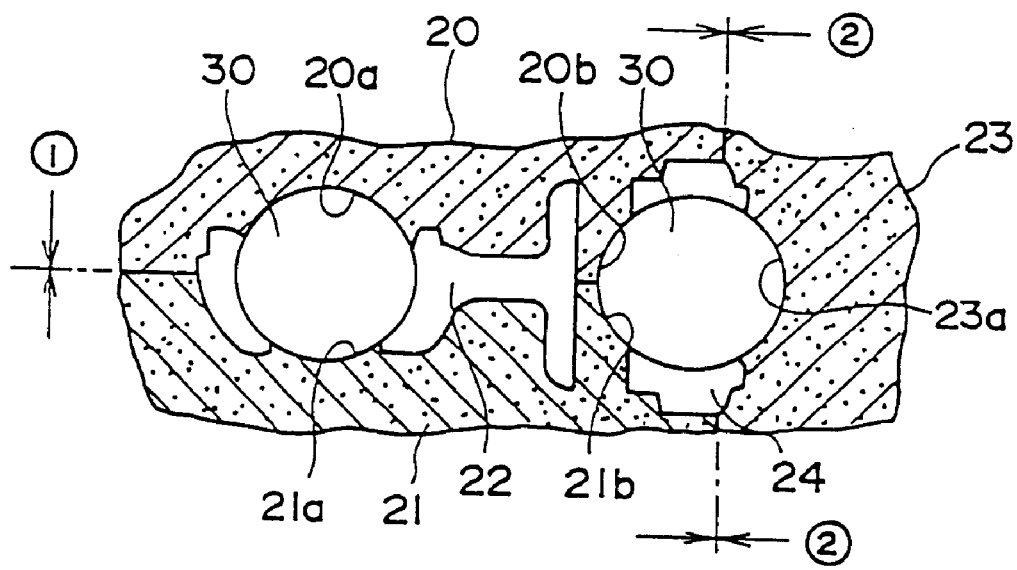
FIG. 3 is a diagram showing manufacturing processes (step 1–step 3) for the connecting rod of the embodiment.
Figure 3:
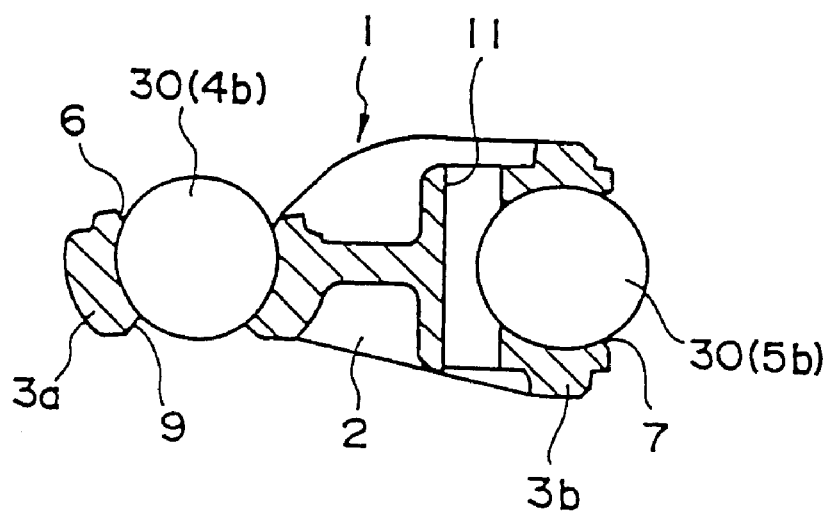

Next, a third die half body 23 is closed with respect to the already closed first and second die half bodies 20, 21 in a direction perpendicular ((2) in FIG. 3) to the closing direction ((1) in FIG. 3) of the first and second die half bodies 20, 21 and then the bearing steel ball 3 is inserted into a second cavity 24 formed by this closing as a core (second step). A third supporting portion 23a projecting in that closing direction is formed in the third die half body 23 and second supporting portions 20b, 21b are formed on the first and second die half bodies 20, 21 so as to project against the third supporting portion 23a. The steel ball 30 inserted into the second cavity 24 is sandwiched between the second supporting portions 20b and 21b by the closing of the third die 23 and then fixed at a predetermined position.

By pouring molten metal into the cavities 22, 24 formed by closing the first-third die half bodies, as shown in FIG. 3(b), the rod main body 1 in which the first ball receiving portion 3a and the second ball receiving portion 3b each holding the steel ball 30 are formed integrally on both ends of the joint portion 2 is cast (third step). In the first ball receiving portion 3a of the rod main body 1 cast in the above manner, the aforementioned connecting opening portion 6 is formed corresponding to the first supporting portion 20a of the first die half body 20 and the aforementioned lubrication opening portion 9 is formed corresponding to the second supporting portion 21a of the second die half body 21. In the second ball receiving portion 3b, the aforementioned through hole 11 is formed corresponding to the second supporting portion 20b of the first die half body 20 and the second supporting portion 21b of the second die half body 21, and then, the aforementioned connecting opening portion 7 is formed corresponding to the third supporting portion 23a of the third die half body 23.

Figure 4:
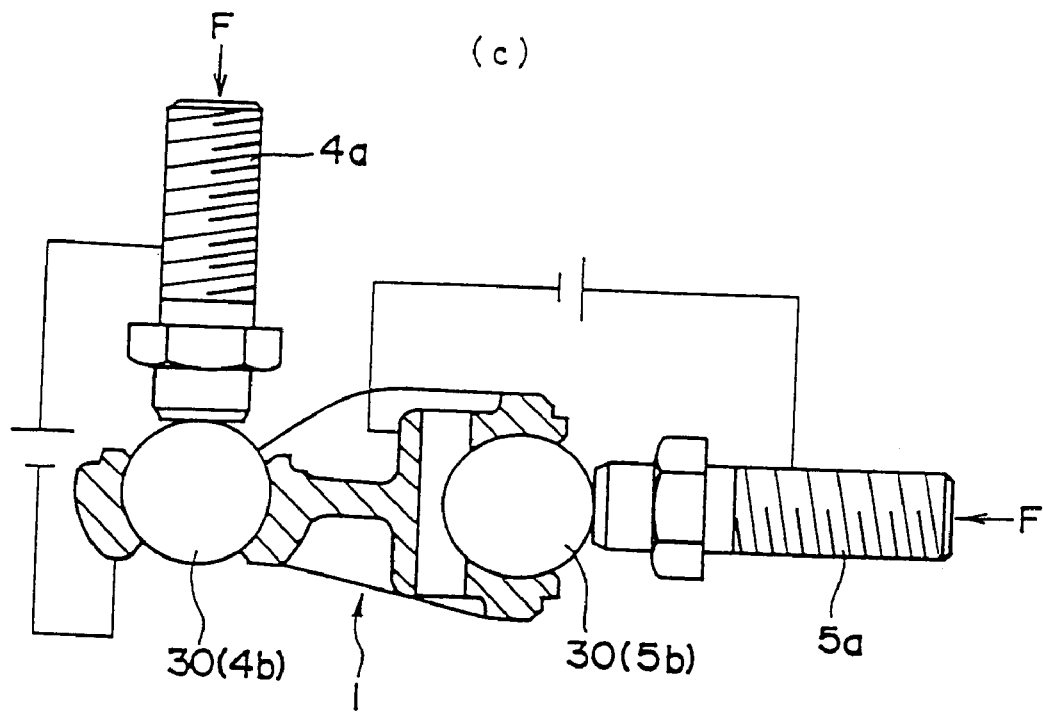
FIG. 4 is a diagram showing manufacturing processes (step 4–step 6) for the connecting rod of the embodiment.
Figure 4:
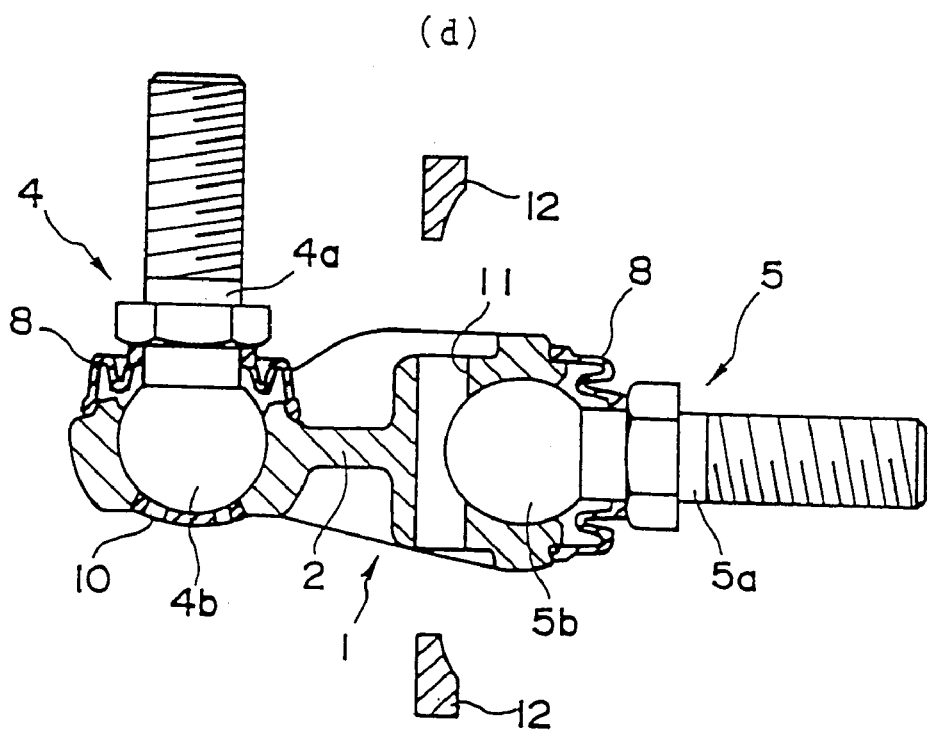
Figure 6:
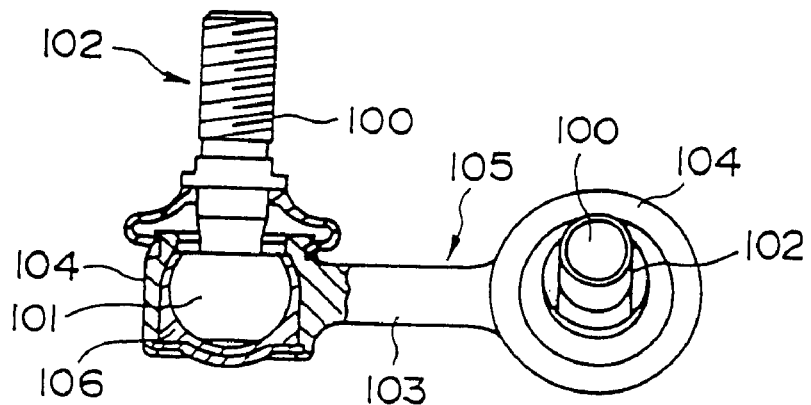
FIG. 6 is a front view (partially sectional view) showing other embodiment of a conventional connecting rod.
Figure 5:
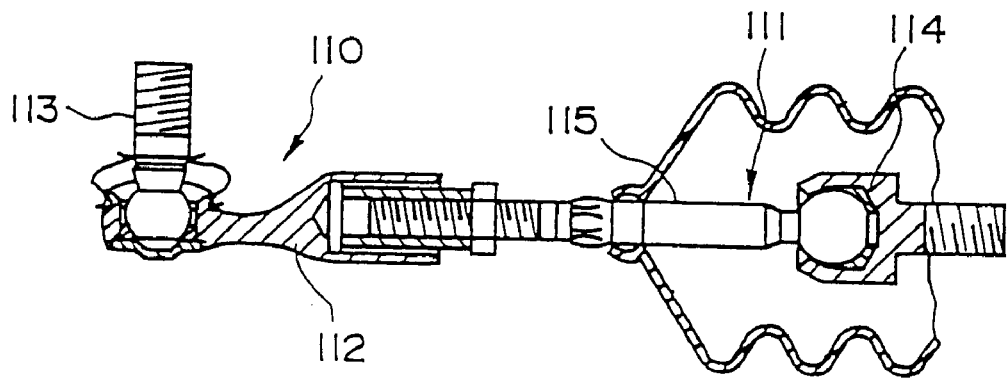
FIG. 5 is a sectional view showing a conventional connecting rod.

In the fourth step, as shown in FIG. 4(c), by welding the shanks 4a, 5a to a pair of the steel balls 30 held by the respective ball receiving portions 3a, 3b of the rod main body 1, the ball-shanks 4, 5 including such steel balls 30 as the ball portions 4b, 5b are formed. This welding is carried out by pressing end faces of the shank portions 4a, 5a against the steel balls 30 at a predetermined force F and further feeding a predetermined welding current between the shanks 4a, 5a and ball receiving portions 3a, 3b.

Here, an electrode for feeding welding current is not connected directly to the steel ball 30, but to the respective ball receiving portions 3a, 3b of the rod main body 1, so that the welding current is indirectly supplied to the steel ball 30 via the ball receiving portions 3a, 3b. Because the respective ball receiving portions 3a, 3b are in firm contact with the steel balls 30 when they are cast in the previous step, even if welding current is supplied indirectly to the steel balls 30 via the rod main body 1, an electric resistance at a border portion between the ball receiving portions 3a, 3b and the steel ball 30 is very small, so that no fusion occurs between the rod main body 1 and steel ball 30.

In the fifth step, a minute gap is formed between the ball receiving portions 3a, 3b and the ball portions 4b, 5b of the respective ball-shanks 4, 5 by applying an external force to the ball receiving portions 3a, 3b of the rod main body 1. To apply such an external force, external faces of the respective ball receiving portions 3a, 3b are tapped so as to give a light shock to the ball portions 4b, 5b of the respective ball-shanks 4, 5. As a result, the ball portions 4b, 5b of the ball-shanks 4, 5 come into a free contact with the ball receiving portions 3a, 3b of the rod main body 1, so that the first ball receiving portion 3a and the second ball receiving portion 3b are swingably or rotatably joined to the first ball-shank 4 and the second ball-shank 5 respectively.

Then, the sealing members 8 are attached between an external edge of the first ball receiving portion 3a and the first ball-shank 4 and between an external edge of the second ball receiving portion 3b and the second ball-shank 5. Further, the cap member 10 is attached to the lubrication opening portion 9 provided in the first ball receiving portion 3a and the through hole 11 made in the second ball receiving portion 3b is filled with the sliding member 12. Consequently, the connecting rod having the ball joints at both the ends is completed (sixth step).

What is claimed is:

1. A manufacturing method of a connecting rod for connecting first and second ball-shanks swingably and rotatably on both ends of a rod main body such that shanks thereof are perpendicular to each other, said manufacturing method comprising:

first step for closing first and second die half bodies, inserting a first ball into a cavity formed in the die half bodies and fixing a first ball in said cavity with a first supporting portion projecting from the die half bodies;

second step for closing a third die half body with respect to the closed first and second die half bodies in a direction perpendicular to the closing direction of said first and second die half bodies, inserting a second ball into a cavity formed by the three die half bodies, and fixing the second ball in said cavity with the second supporting portion projecting from said first and second die half bodies and third supporting portion projecting from said third die half body;

third step for casting the rod main body holding said first and second balls and in which opening portions communicating with each of the balls are formed corresponding to said first-third supporting portions by pouring molten metal into cavities in casting dies formed by closing the respective die half bodies;

fourth step for forming said first and second ball-shanks by joining the shank to each of the balls in said rod main body via an opening portion formed in said rod main body by said first-third supporting portions; and fifth step for forming a gap between each ball and rod main body by providing said rod main body and each ball-shank with an external force.

2. A manufacturing method of a connecting rod as claimed in claim 1 further comprising the step of filling the opening portion formed in the rod main body by said second supporting portion with a low friction member.

* * * * *